No. 635,171. Patented Oct. 17, 1899.
L. MATHIEU.
DRIVING GEAR FOR MOTOR VEHICLES.
(Application filed June 30, 1899.)
(No Model.)
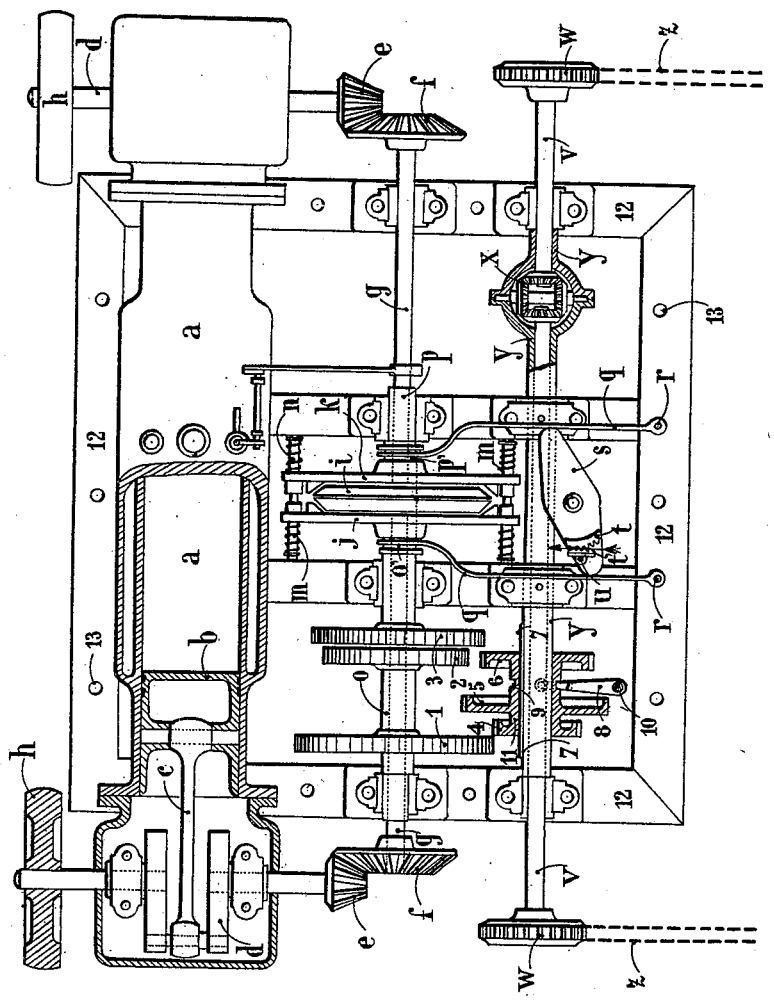
Witnesses.
Inventor.
Louis Mathieu.
By James L. Norris.
Attÿ.

UNITED STATES PATENT OFFICE.

LOUIS MATHIEU, OF PARIS, FRANCE.

DRIVING-GEAR FOR MOTOR-VEHICLES.

SPECIFICATION forming part of Letters Patent No. 635,171, dated October 17, 1899.

Application filed June 30, 1899. Serial No. 722,459. (No model.)

*To all whom it may concern:*

Be it known that I, LOUIS MATHIEU, a citizen of France, residing at Paris, have invented certain new and useful Improvements in Driving-Gears for Motor Road-Vehicles, of which the following is a specification.

This present invention relates to an improved driving-gear for motor road-vehicles, of which the following is a full, clear, and exact description.

This invention consists in the construction and arrangement of parts, as will be herein fully described and claimed.

Reference is to be had to the accompanying drawing, which is a top view, partly in section, of my improved driving-gear for motor road-vehicles.

My improved driving-gear for motor road-vehicles comprises a motor having a single cylinder $a$, with two pistons $b$ acting in opposite directions relatively to each other. These pistons jointly transmit by connecting-rods $c$ rotation to two crank-shafts $d$ and therefrom by means of gearing $e$ and $f$ to a distributing-shaft $g$, which revolves not so fast as the crank-shafts $d$. These parts are all arranged symmetrically relatively to the axle of the vehicle. The two crank-shafts $d$ carry fly-wheels $h$ to insure regularity of motion and arranged at the fore part, as shown.

At or about the center of the distributing-shaft $g$ is keyed a disk $i$, having a double-beveled edge, and upon each side of this disk plates $j$ $k$ are arranged having their inner faces hollow and shaped to conform to the said disk $i$. These hollow-faced plates $j$ and $k$ are free to slide on the distributing-shaft. They are guided by studs $m$ and are acted on by springs $n$, which tend to press them against the disk $i$. These plates $j$ and $k$ are keyed upon sleeves $o$ $p$, adapted to slide and turn freely upon the shaft $g$, their movement along the shaft, although very slight, being obtained by means of two forks $q$, pivotally connected to the vehicle at $r$ and engaging with grooves $o'$ $p'$, provided in the said sleeves. These forks can be actuated by a cam $s$, carrying a toothed sector $t$, which gears with a similar sector $t'$, fixed to a vertical lever $u$, mounted on a suitable part of the vehicle, or by any other equivalent arrangement. The disk $i$, which is keyed to the shaft $g$, and the plate $j$, which is secured to the sleeve $o$, enable the sleeve $o$ to be connected with and rotated by the shaft $g$, thereby rotating the wheels 1, 2, and 3. The plate $k$ merely serves to balance the clutch part of the driving-gear or maintain the latter symmetrical in motion, as it were.

As usual in motor road-vehicles, the intermediate shaft $v$ is divided into two parts connected together by means of a differential gear $x$, inclosed in a box $y$. This box is provided with a sleeve which covers the shaft $v$ on its length. This shaft $v$ carries at its ends spur-wheels $w$, which by means of chains $z$ set in motion the wheels of the vehicle.

The gearing between the driving-shaft $g$ and the intermediate shaft $v$ is arranged to provide three speeds. The sleeve $o$ carries a set of gear-wheels 1 2 3, (say three of different diameters,) which may gear when desired, respectively, with the wheels 4 5 6 of another set keyed on a sleeve 11, slidably adjusted upon the sleeve $y$, which is free to turn on the shaft $v$, arranged parallel to the distributing-shaft. If preferred, these wheels 4 5 6 may be made in one part with this sleeve 11. This sleeve 11 is connected to the sleeve $y$ by the linchpin 7. A fork 8, engaging a groove 9 and pivoted at 10 to the vehicle, allows of the sliding movement of the sleeve 11 and of the wheels 4 5 6 connected therewith.

The described driving-gear is arranged upon a suitable frame 12, having holes 13 to receive the bolts by which to fasten the whole mechanism to the vehicle.

Having now described my invention, I claim as new and desire to secure by Letters Patent—

1. In a driving-gear for motor road-vehicles, the combination of a motor having one cylinder and two pistons which jointly transmit to the distributing-shaft a continued and slackened rotating motion, of a distributing-shaft having a double friction-clutch, each plate of which is secured to a sleeve turning freely on the said distributing-shaft, of another shaft arranged parallel to the distributing-shaft, this shaft passing through a sleeve, being separated into two parts, connected together by differential mechanism gearing and carrying at its two ends chain-wheels to transmit movement to the driving-wheels of the vehicle, the said sleeve carrying a set of gear-wheels of different diameters, the corresponding sleeve of the distributing-shaft carrying a corresponding set of gear-wheels, the whole being bolted on a suitable frame, substantially as described.

2. In driving-gears for motor road-vehicles, the combination of a double friction-clutch, having a double-beveled disk keyed on the distributing-shaft, and upon each side of this disk plates being arranged, having their inner faces hollow and shaped to conform to the said disk, these plates being keyed upon sleeves adapted to turn freely upon the said shaft, springs being provided to press the plates against the disk, the plates being actuated by any suitable mechanism, substantially as described.

In testimony whereof I have hereunto set my hand in presence of two subscribing witnesses.

LOUIS MATHIEU.

Witnesses:
EDWARD P. MACLEAN,
ALFRED FREY.